United States Patent [19]

Tanaka et al.

[11] Patent Number: 5,948,319

[45] Date of Patent: *Sep. 7, 1999

[54] NEMATIC LIQUID CRYSTAL MIXTURES

[75] Inventors: Yukiomi Tanaka, Atsugi; Hiroshi Numata, Yokohama, both of Japan

[73] Assignee: Merck Patent Gesellschaft mit beschrankter Haftung, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/816,133

[22] Filed: Mar. 12, 1997

Related U.S. Application Data

[63] Continuation of application No. 08/576,089, Dec. 21, 1995, abandoned.

[30] Foreign Application Priority Data

Dec. 22, 1994 [EP] European Pat. Off. .............. 94120360

[51] Int. Cl.⁶ .......................... C09K 19/12; C09K 19/30
[52] U.S. Cl. ............................. 252/299.66; 252/299.63
[58] Field of Search ........................... 252/299.66, 299.63

[56] References Cited

U.S. PATENT DOCUMENTS

| | | | |
|---|---|---|---|
| 5,122,295 | 6/1992 | Weber et al. | 252/299.01 |
| 5,328,644 | 7/1994 | Goulding et al. | 252/299.66 |
| 5,382,380 | 1/1995 | Kurihara et al. | 25/299.66 |
| 5,487,845 | 1/1996 | Reiffenrath et al. | 252/299.63 |
| 5,494,605 | 2/1996 | Kurihara et al. | 252/299.66 |
| 5,496,499 | 3/1996 | Poetsch et al. | 252/299.66 |
| 5,498,365 | 3/1996 | Nolan et al. | 252/299.01 |

*Primary Examiner*—C. H. Kelly
*Attorney, Agent, or Firm*—Miller, White, Zelano, & Branigan, P.C.

[57] ABSTRACT

A nematic liquid crystal mixture having a birefringence Δn of at least 0.20, comprising at least one fluorinated terphenyl of formula I

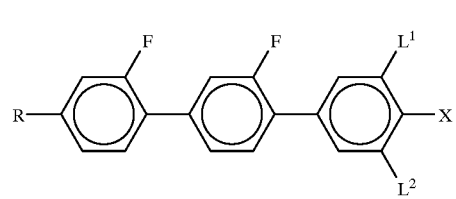

and at least one fluorinated terphenyl of formula II

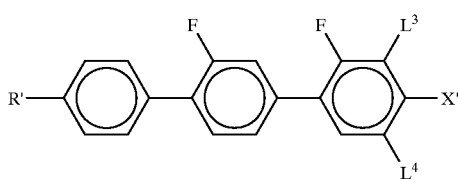

wherein R and R' are each independently of one another or alkyl of up to 12 C atoms, optionally substituted by halogen, $CH_2$ group optionally replaced, in each case independently of one another, by —O—,

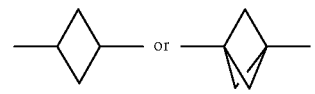

in such a manner that oxygen atoms are not linked directly to one another, X and $X^1$ are each independently F, Cl, $CF_3$, $OCF_3$ or $OCHF_2$, and $L^1$–$L^4$ are each independently H or F.

10 Claims, No Drawings

NEMATIC LIQUID CRYSTAL MIXTURES

This application is a continuation of application Ser. No. 08/576,089, filed Dec. 21, 1995 now abandoned.

The invention relates to nematic liquid crystal mixtures having an optical birefringence Δn of at least 0.21, said mixtures being useful for an active matrix liquid crystal display (AMD) being operated in the second or a higher transmission minimum of the Gooch-Tarry curve.

Active matrix displays (AMD) are highly favored for commercially interesting displays with a high information content Such AMDs are used for TV application (e.g. for projection systems) and also for displays for e.g. laptops, automobiles and airplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.: metal insulator metal: MIM) [Niwa, K, et al., 1984, SID 84, Digest, pp. 304–307] can be applied. These non-linear driving elements allow to use an electro-optical effect with a rather flat electro-optical characteristic if a good viewing angle characteristic can be obtained. So a TN-type LC cell [Schadt, M. and Helfrich, W., 1971, Appl. Phys. Lett., 18, 127] with a twist angle of 90,° can be used. To provide the good contrast over a wide viewing angle, operation in the first minimum of transmission [Pohl, L., Eidenschink, R., Pino, F. del., and Weber, G. 1980, German Pat., DBP 30 22 818, and 1981, U.S. Pat. NO. 4 398 803; Pohl, L., Weber, G., Eidenschink, R., Baur, G., and Fehrenbach, W., 1981, Appl. Phys. Lett., 38, 497; Weber, G., Finkenzeller, U., Geelhaar, T., Plach, H. J., Rieger, B., and Pohl, L., 1988, Int. Symp. on Liq. Cryst., Freiburg, to be published in Liq. Crys.] is required. These AMDs are very well suited for TV applications and consequently are of high commercial interest. For these applications some physical properties of the liquid crystals become more important than for passive TN displays. Some of the decisive properties for the performance of an AMD are resistivity and stability of the liquid crystal [Togashi. S., Sekiguchi, K., Tanabe, H., Yamamoto, E., Sorimachi, K., Kajima, E., Watanabe, H., Shimuzu, H., Proc. Eurodisplay 84, September 1984: A 210–288 Matrix LCD Controlled by Double Stage Diode Rings, p.144 ff, Paris; Stromer, M., Proc. Eurodisplay 84, September 1984: Design of Thin Film Transistors for Matrix Addressing of Television Liquid Crystal Displays, p. 145 ff, Paris]. A problem often encountered is the adverse influence of UV-illumination on the resistivity and therefore on the general performance of the liquid crystal mixture in the display.

In an AMD the non-linear switching elements are addressed in a multiplex scheme. So they charge the electrodes of a pixel in the limited time they are active. Then they become inactive until they are addressed again in the next cycle. Consequently the change of the voltage on an activated (charged) pixel is a nondesired but a very decisive feature of such a display. The discharge of a pixel is determined by two factors. These are the capacity of the pixel element including liquid crystal and resistivity of the dielectric material between the electrodes, namely the liquid crystal. The characteristic time constant of the decay of the voltage at a pixel (RC-time) has to be significantly bigger than the time between two adressing cycles ($t_{adr.}$). A parameter frequently used to describe the performance of an AMD is the voltage holding ratio HR of a picture element:

$$HR = \frac{V(t_0) + V(t_0 + t_{adr.})}{2V(t_0)}$$

As the voltage at a pixel decays exponentially an increase of the holding ratio necessitates liquid crystal materials with exceptionally high resistivities.

There are several points of importance for the resistivity of the liquid crystal inside a display, e.g. orientation layers, curing condition of the orientation material. But by no means less important are the electrical properties of the liquid crystal used. Especially the resistivity of the liquid crystal in the display determines the magnitude of the voltage drop at the pixel.

Earlier investigations with low-Δn materials have shown, that the requirements with regard to resistivity and UV-stability and temperature dependence of the resistivity for TFT-applications cannot be met with materials containing cyano moieties as terminal groups. Non-cyano materials containing halogenated terminal groups can show for better resistivity values and UV-stability as well as superior viscosity values than conventionally used cyano materials. However, in general these non-cyano materials unfortunately show a strong tendency towards forming crystalline and/or smectic phases, especially at low temperatures. Also the clearing points and the dielectric anisotropy values of non-cyano materials with halogenated terminal groups are much lower.

Modern commercial mixtures have to operate over a wide temperature range; therefore, crystallization or formation of smectic phases at low temperatures has to be excluded. Good solubility is one of the most important preconditions for the usability of liquid crystalline materials in the development of nematic mixtures. Compounds with high melting temperatures or a tendency to form smectic phases are for this reason not suitable.

By very careful selection of the components and an appropriate mixture design it was possible to find low birefringence non-cyano mixtures having a broad nematic temperature range for first minimum application [B. Rieger et al., Proc. 18. Freiburger Arbeitstagung Flüssigkristalle, Freiburg 1989, 16 (1989)]. Non-cyano materials with high birefringence, which are essential for the mixture concept of this invention unfortunately show in many cases even more unfavourable properties such as high melting points and/or strongly smectogenic behaviour than similar materials with lower birefringence:

| No. | Chemical structure | Δn | Mesophases (° C.) |
|---|---|---|---|
| 1 | 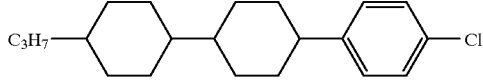 | 0.126 | K 70 S 79 N 193 I |

-continued

| No. | Chemical structure | Δn | Mesophases (° C.) |
|---|---|---|---|
| 2 | 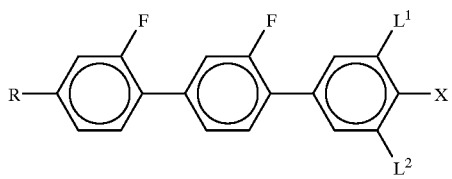 | 0.199 | K 142 N 192 I |
| 3 | 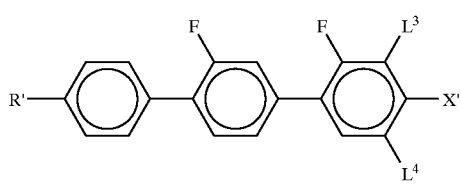 | n.m. | K 105 S 245 I |

The broad general formula of WO 90/09240 covers fluoro terphenyls of the formula I but there is no single example disclosed of these compounds nor of mixtures containing fluorinated fluoro- and chloroterphenyls.

Mixtures of the state of the art with a birefringence suited for operation in the second or a higher transmission minimum of the Gooch-Tarry curve are not acceptable for active matrix application.

There is thus still a great need for liquid-crystal composition having a high resistivity and other suitable material properties for use in AMDs The chloroterphenyls No. 3 as shown above are known from JP 60-056 932-A. As outlined above these compounds do not allow to meet the severe specifications from the electronic industry, especially in view of their limited solubility in other LC materials, their high melting points and their pronounced smectogenity. Accordingly there is also a need in the art for improved non-cyano high birefringence LC compounds.

The chloroterphenyls of formula I have been disclosed on the international LC Conference in Pisa/Italy, 1992, and in Liquid Crystals, 1993, Vol. 14, No. 5, pp. 1397–1408.

SUMMARY OF THE INVENTION

The invention has for one of its objectives to provide a nematic liquid crystal mixture having a birefringence Δn of at least 0.20, characterized in that the mixture comprises one or more fluorinated terphenyls having the formula I

I $$\text{(structure I)}$$

and one or more fluorinated terphenyls having the formula II

II $$\text{(structure II)}$$

wherein

R and R' are each independently of one another an alkyl or alkenyl radical having up to 12 C atoms, these radicals being unsubstituted or substituted by halogen, it also being possible for one or more $CH_2$ groups in these radicals to be replaced, in each case independently of one another, by —O—,

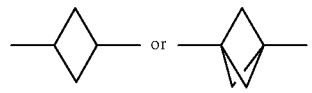

is such a manner that oxygen atoms are not linked directly to one another. Preferably one or two $CH_2$ groups may be replaced.

X and X' are each independently of one another F, Cl, $CF_3$, $OCF_3$ or $OCHF_2$, and $L^1$–$L^4$ are each independently of one another H or F.

In the compounds of the formulae I and II R and R' are preferably alkyl or alkoxy, with preferably 3–5 carbon atoms. Where R and R' are substituted by halo, substitution is up to perhalo, but preferably up to 5 halogen atoms.

The invention has also for its objective to provide a matrix liquid crystal display with high temperature and UV-stability containing two plane parallel support plates which together with a frame form a cell of the thickness d, integrated non-linear elements for switching individual picture elements on the support plates, and a nematic liquid crystal mixture which is present in the cell, has a positive dielectric anisotropy and a birefringence Δn, the display being operated in the second or a higher transmission minimum of the Gooch-Tarry curve by appropriate selection of d. Δn, characterized in that the quotient of the voltage holding ratio $HR_{20}$ after 20 hours exposure to UV-light (280–400 nm, 12 mW/cm$^2$) and $Hr_0$ before exposure to UV-light is larger or equal to 98% and also liquid crystal compositions with a very high resistivity which meet also the other demands.

It has now been found that such values for the HR are even possible for mixtures with higher birefringence by using laterally fluorinated and/or ethyl-linked non-cyano materials. Very high RC time values can be obtained in AMDs. These mixtures also show a reduced viscosity and allow short switching times at reasonable threshold voltages.

The thickness of the AMDs is preferably in the range of 3 to 10 μm. Especially preferred is the range from 3 to 7 μm.

The following preferred embodiment concern the nematic liquid crystal mixture which is present in the AMD:

The birefringence Δn of the nematic liquid crystal mixture is at least 0.20 preferred 0.22 to 0.29.

The dielectric anisotropy of the nematic liquid crystal mixture is at least +4.0.

The liquid crystal mixture preferably comprises one or more compounds of the formula II

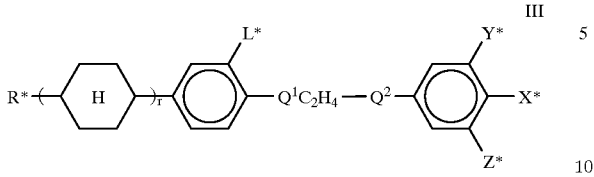

wherein $R^*$ is an alkyl or alkenyl radical having up to 15 C atoms, these radicals being unsubstituted or substituted by halogen, it also being possible for one or more $CH_2$ groups in these radicals to be replaced, in each case independently of one another, by —O—,

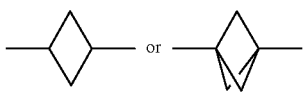

in such a manner that oxygen atoms are not linked directly to one another, r is 0 or 1, $X^*$ is F, Cl, $CF_3$, $OCF_3$ or $OCHF_2$, and $L^*$, $Y^*$ and $Z^*$ are each H or F, and one of $Q^1$ and $Q^2$ is 1,4-phenylene or 3-fluoro-1,4-phenylene and the other residue is a single bond $R^*$ preferably has 3–5 carbon atoms. Halogen substitution on $R^*$ is up to perhalo, but preferably up to 5 halogen atoms.

The compounds of the formula IIIa are particularly preferred:

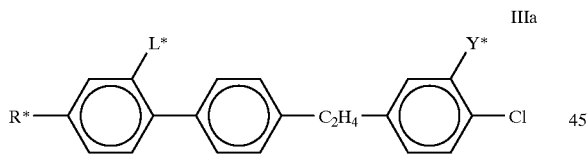

The liquid crystal mixture preferably comprises one or more compounds selected from the formulae IV to VII

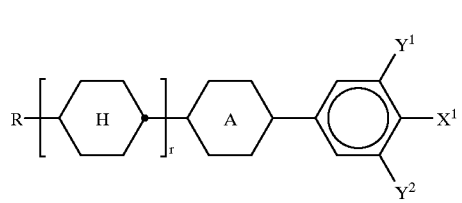

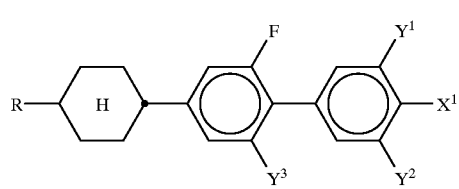

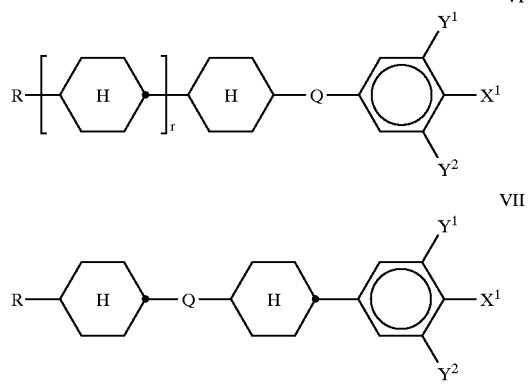

wherein

R and R' are each an alkyl or alkenyl radical having up to 12 C atoms, these radicals being unsubstituted or substituted by halogen, it also being possible for one or more $CH_2$ groups in these radicals to be replaced, in each case independently of one another, by —O—,

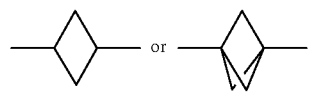

is such a manner that oxygen atoms are notlinked directly to one another, $X^1$ is F, Cl, $CF_3$, $OCHF_2$, fluoroalkyl or fluoroalkoxy, up to perfluoro, in each case having up to 7 carbon atoms, $Y^1$, $Y^2$ and $Y^3$ are each H or F.

Q is —$C_2H_4$—, —$C_4H_9$— or —CO—O—,

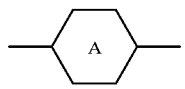

is trans-1,4-cyclohexylene or 1,4-phenylene, and r is 0 or 1.

Preferred mixtures contain at least one compound of the formula IV wherein r=0 and/or r=1 and/or a compound of the formula V.

The compound of the general formula V is preferably a compound of the formula Va and/or Vb:

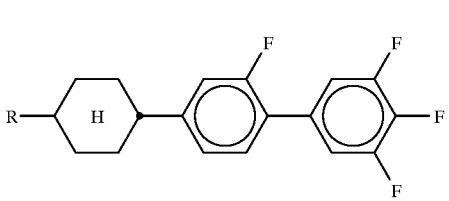

-continued

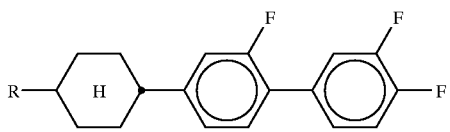
Vb

The liquid crystal mixture preferably comprises one or more compounds of the formula VII to XIII:

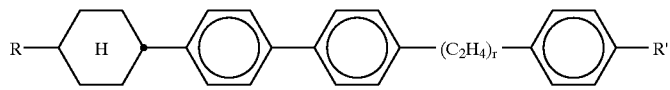
VIII

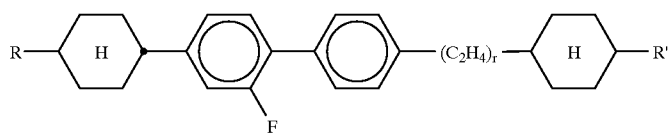
IX

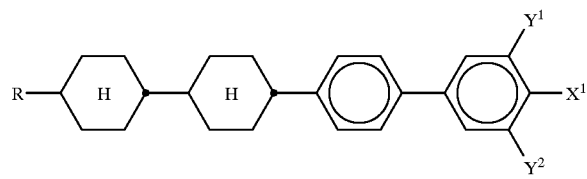
IX

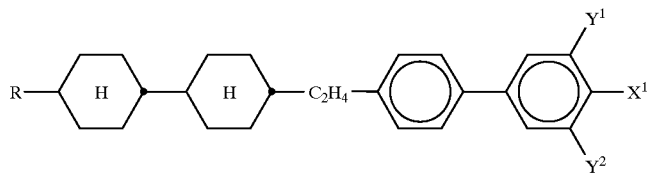
XI

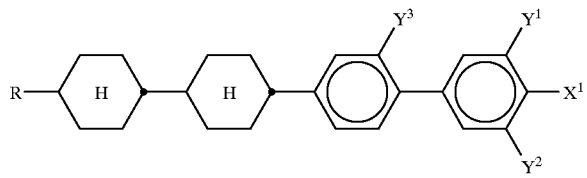
XII

XIII in which

R, R', r, $X^1$, $Y^1$, $Y^2$, $Y^3$ are each, independently from one another, as defined as above.

The mixture essentially comprises compounds selected from the group comprising the general formulae I to VII.

The compounds shown above are known from, e.g., DOS 30 42 391 (U.S. Pat. Nos. 4,415,470 and 4,545,992) DOS 39 02 328, DOS 39 13 554, DOS 39 09 802 (U.S. Pat. No. 5,389,292), WO 89/02884 (U.S. Pat. No. 5,324,449) WO 90/15113, WO 90/09420, the International Patent Appln. No. PCT/EP 90/01292, No.,PCT/EP 91/0041 1, No. PCT/EP 90/01471, No. PCT/EP 90/02109 and the European Patent Appln. No. 91 100 675.7 or can be prepared in analogy to known compounds.

The mixtures according to the present invention usually are based on the medium polar components having the indicated core structure and other non-cyano components. Of course, however, such mixtures can also additionally contain known cyano LC components if extremely high values for the HR are not needed, e.g. for TN or STN-use.

The resulting mixtures are important for achieving very broad nematic phase ranges including very low temperatures (outdoor use).

The mixtures are preferably based on halogenated components of medium polarity and/or are essentially free of cyano components. One of ordinary skill can easily optimize proportions of the various components based on the desired properties of the mixture.

The novel compounds of the formula I can be prepared in analogy to the methods described in EP 0 439 089A1, WO 90109420, WO 90/15113 and WO 91113850.

In the components of the formulae I to XIII R, R' and R* are preferably a straight-chained alkyl radical of 1 to 7 carbon atoms or is straight-chained methoxy alkyl (methoxymethyl, methoxyethyl, methoxypropyl, methoxybutyl, methoxypentyl, methoxyhexyl, methoxyheptyl).

The preparation of the mixtures according to the invention is effected in the conventional manner. In general, the desired amount of the components which is used in the smaller amount is dissolved in the components which constitutes the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example acetone, chloroform or methanol, and to remove the solvent does not introduce any contaminants or undesirable dopants.

By means of suitable additives the liquid crystal phases according to the invention can be modified in such a way that they can be used in any hitherto disclosed kind of AMD.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding European application 94/120360.6, filed Dec. 22, 1995, is hereby incorporated by reference.

The measurement of HR was performed as described by S. Matsumoto et al. (Liquid Crystals 5, 1320 (1989)) in standard 6$\mu$ TN-displays without spacers. Standard floatglass with conductive ITO layers (Balzers) and a rubbed polyimide layer (AL-1051 of Japan Synthetic Rubber) as orientation layer was used. The cells were sealed with an UV-curable adhesive (NOA41 of Norland) and filled under standard conditions. The liquid crystal mixture was composed of components being carefully purified under standard procedures. UV exposure was performed in a Heraeus-Suntest with a Xenon lamp (1. 1 kw, 0.082 W/cm$^{2,}$ UV cutoff 310 nm).

In the present patent application and in the following examples all chemical structures of LC compounds are given by acronyms the transformation of which into chemical formulae is done as shown in the following All residues $C_nH_{2n+1}$ and $C_mH_{2m+1}$ are straight-chained alkyl groups with n resp.m carbon atoms. The code of Table B is selfexplanatory. In Table A only the acronym for the core structure is given. In a concrete this acronym is followed by a dash and a code for the substituents $R^1$, $R^2$, $L^1$, $L^2$ and $L^3$ as follows:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $OC_nH_{2+1}$ | $C_mH_{2m+1}$ | H | H | H |
| n | $C_nH_{2n+1}$ | CN | H | H | H |
| nN.F | $C_nH_{2n+1}$ | CN | F | H | H |
| nF | $C_nH_{2n+1}$ | F | H | H | H |
| nOF | $OC_nH_{2n+1}$ | F | H | H | H |
| nCl | $C_nH_{2n+1}$ | Cl | H | H | H |
| nF.F | $C_nH_{2n+1}$ | F | F | H | H |
| nOmFF | $C_nH_{2n+1}$ | $OC_mH_{2m+1}$ | F | H | F |
| nmF | $C_nH_{2n+1}$ | $C_mH_{2m+1}$ | H | H | F |
| nCF$_3$ | $C_nH_{2n+1}$ | CF$_3$ | H | H | H |
| nOCF$_3$ | $C_nH_{2n+1}$ | OCF$_3$ | H | H | H |
| nOCF$_3$ | $C_nH_{2n+1}$ | OCHF$_2$ | H | H | H |
| nS | $C_nH_{2n+1}$ | NCS | H | H | H |
| rVsN | $C_rH_{2n+1}$—CH=CH—$C_sH_{2s}$— | CN | H | H | H |
| rEsN | $C_rH_{2n+1}$—O—$C_2H_{2s}$— | CN | H | H | H |
| nNF | $C_nH_{2n+1}$ | CN | H | H | F |
| nAm | $C_nH_{2n+1}$ | $COOC_mH_{2m+1}$ | H | H | H |
| nF.F.F | $C_nH_{2n+1}$ | F | F | F | H |
| nF.F | $C_nH_{2n+1}$ | F | F | H | H |

TABLE A

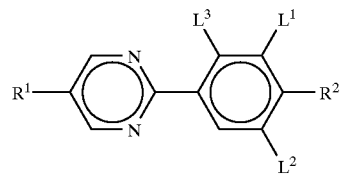

PYP

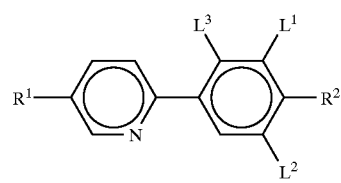

PYRP

TABLE A-continued
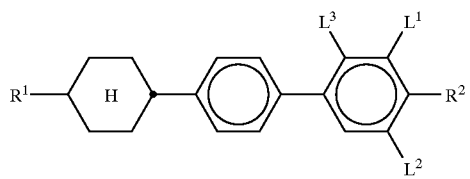
BCH
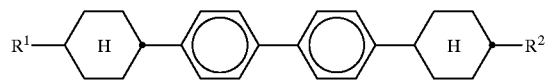
CBC
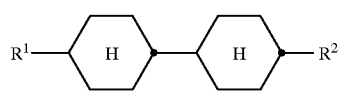
CCH
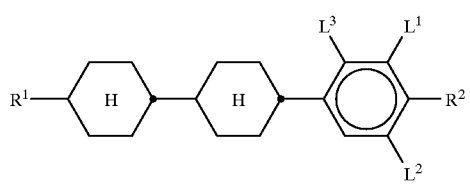
CCP
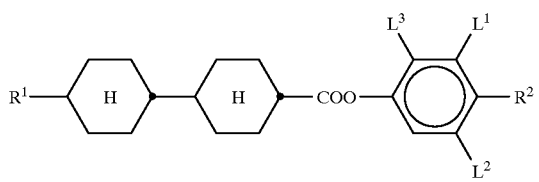
CP
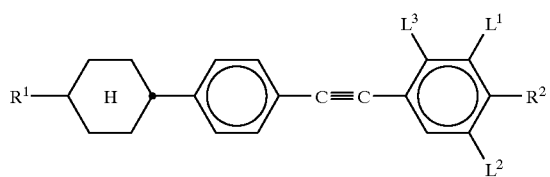
CPTP
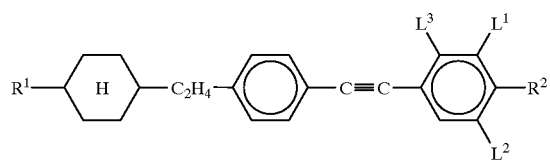
CEPTP TABLE A-continued
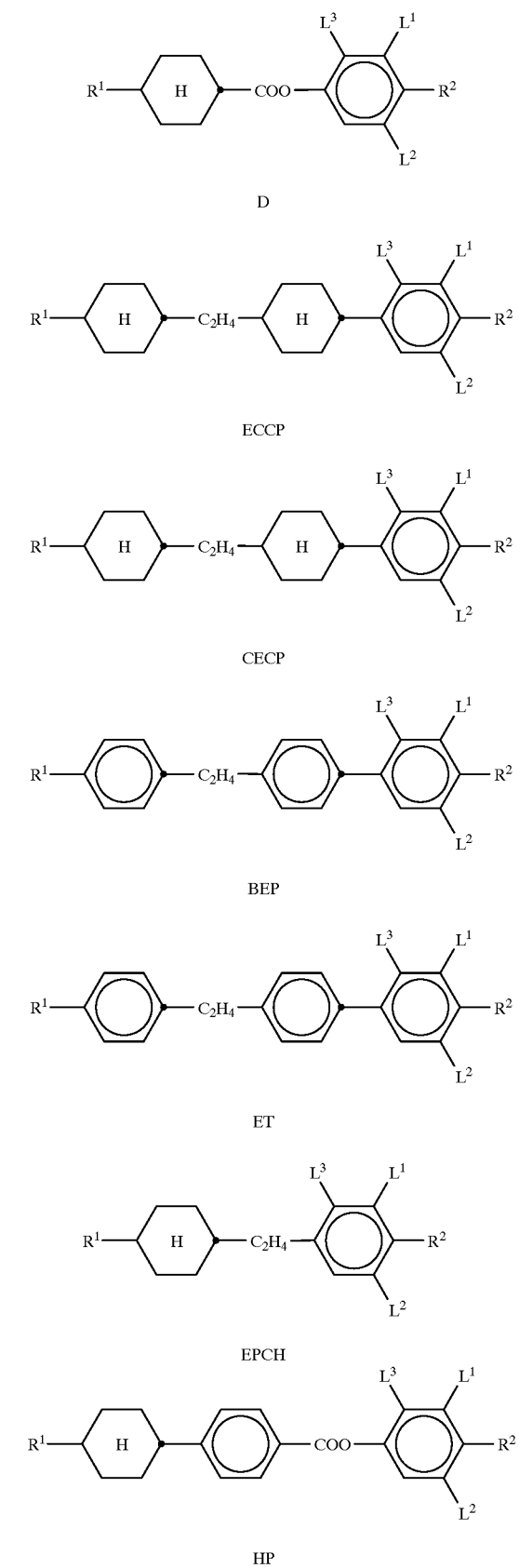
D
ECCP
CECP
BEP
ET
EPCH
HP TABLE A-continued
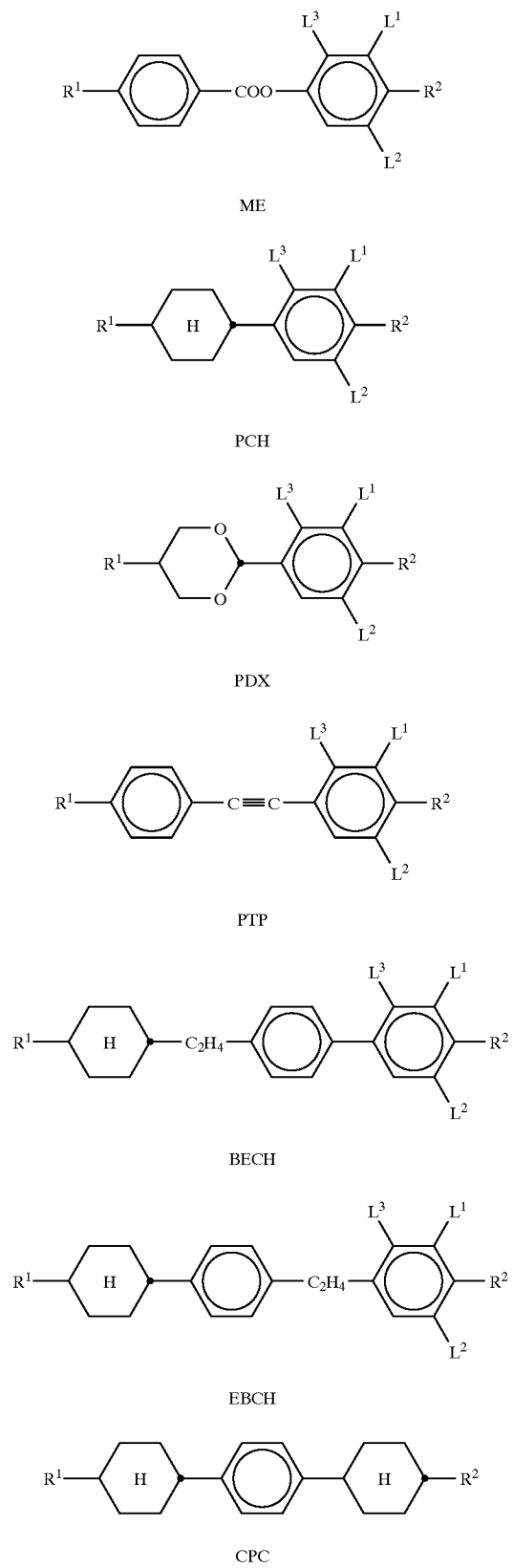
ME
PCH
PDX
PTP
BECH
EBCH
CPC TABLE A-continued
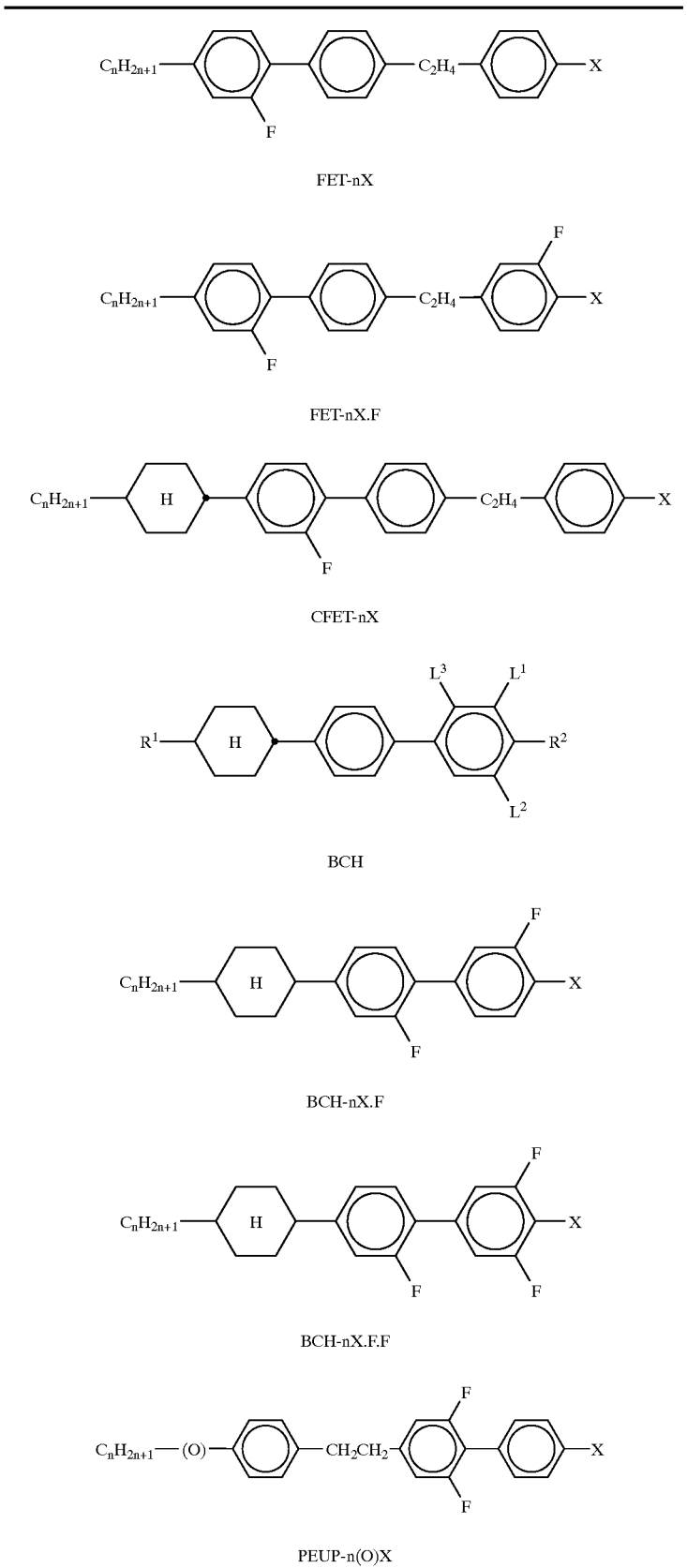

TABLE A-continued
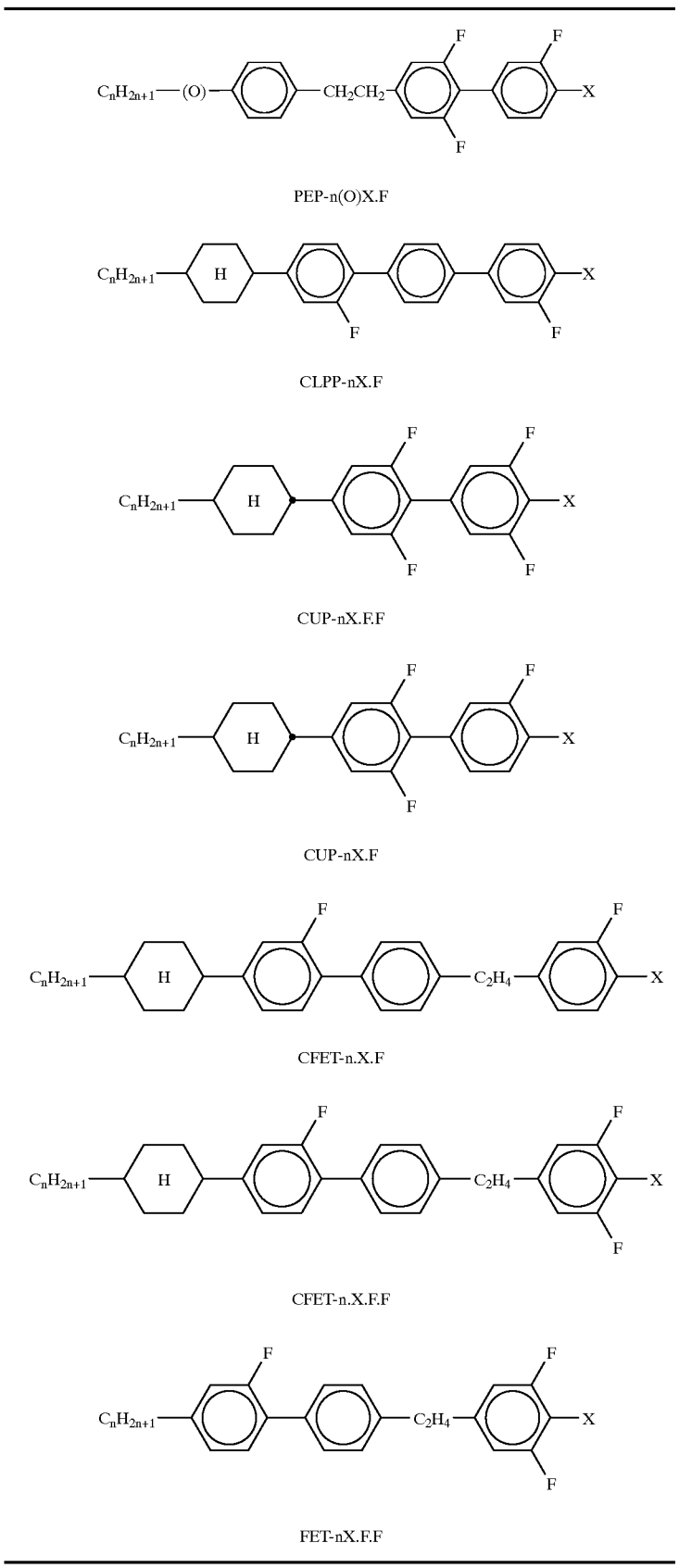

TABLE B
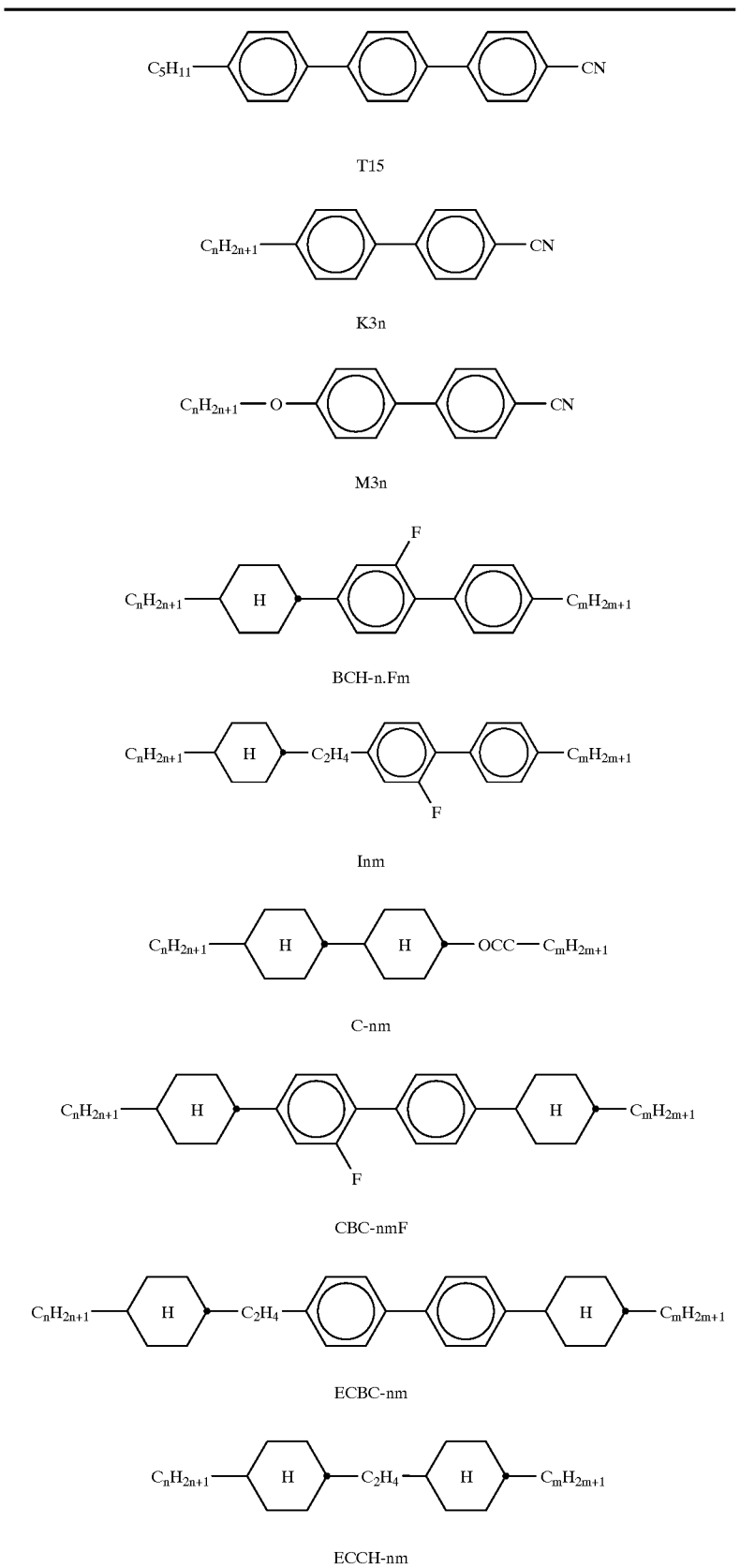

TABLE B-continued
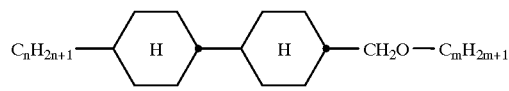
CCH-n1EM
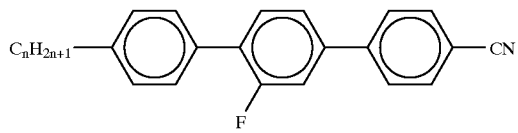
T-nFN
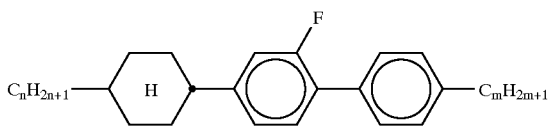
BCH-nmF
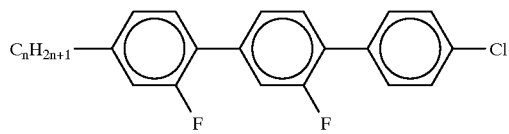
FT-n.FCl
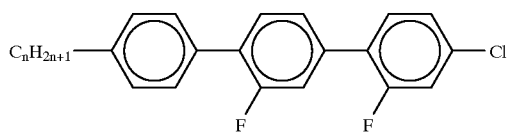
T-nFClF
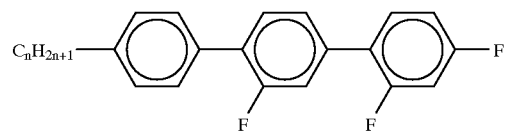
T-nFFF
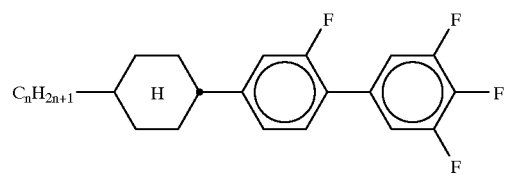
CGU-n-F
| Example 1 | | |
|---|---|---|
| FET-2Cl | 14.0% | |
| FET-3Cl | 8.0% | Clearing point [° C.]: 93 |
| FET-5Cl | 18.0% | Δn [589 nm, 20° C.]: +0.2547 |
| FT-3.FCl | 15.0% | Δε [1 kHz, 20° C.]: 6.8 |
| FT-5.FCl | 15.0% | |
| T-3FClF | 15.0% | |
| T-5FClF | 15.0% | |
| Example 2 | | |
| FET-2Cl | 15.0% | |
| FET-3Cl | 7.0% | Clearing point [° C.]: 73 |

TABLE B-continued

| | | |
|---|---|---|
| FET-5Cl | 18.0% | Δn [589 nm, 20° C.]: +0.2230 |
| T-3FClF | 6.0% | Δε [1 kHz, 20° C.]: 11.3 |
| T-5FClF | 8.0% | |
| FT-5.FCl | 14.0% | |
| BCH-3F.F | 6.0% | |
| BCH-5F.F | 6.0% | |
| K6 | 10.0% | |
| K15 | 10.0% | |
| Example 3 | | |
| | | |
| FET-2Cl | 15.0% | |
| FET-3Cl | 8.0% | Clearing point [° C.]: 88 |
| FET-5Cl | 21.0% | Δn [589 nm, 20° C.]: +0.2388 |
| T-3FClF | 11.0% | Δε [1 kHz, 20° C.]: 5.7 |
| T-5FClF | 15.0% | |
| FT-5.FCl | 8.0% | |
| FT-3.FCl | 17.0% | |
| BCH-3F.F | 5.0% | |
| Example 4 | | |
| | | |
| FET-2Cl | 16.0% | |
| FET-3Cl | 8.0% | Clearing point [° C.]: 89 |
| FET-5Cl | 18.0% | Δn [589 nm, 20° C.]: +0.2480 |
| T-3FClF | 16.0% | Δε [1 kHz, 20° C.]: 5.0 |
| T-5FClF | 16.0% | |
| T-3FFF | 8.0% | |
| FT-5.FCl | 18.0% | |
| Example 5 | | |
| | | |
| FET-2Cl | 16.0% | |
| FET-3Cl | 8.0% | Clearing point [° C.]: 91 |
| FET-5Cl | 21.0% | Δn [589 nm, 20° C.]: +0.2428 |
| T-3FClF | 16.0% | Δε [1 kHz, 20° C.]: 4.5 |
| T-5FClF | 16.0% | |
| FT-5.FCl | 18.0% | |
| BCH-3F.F | 5.0% | |
| Example 6 | | |
| | | |
| FET-2Cl | 14.0% | |
| FET-3Cl | 7.0% | Clearing point [° C.]: 75 |
| FET-5Cl | 16.0% | Δn [589 nm, 20° C.]: +2051 |
| T-3FClF | 9.0% | $V_{(10,0,20)}$ [V]: 2.15 |
| T-5FClF | 9.0% | |
| FT-5.FCl | 7.0% | |
| T-nFFF | 13.0% | |
| BCH-2F.F | 4.0% | |
| BCH-3F.F | 3.0% | |
| BCH-5F.F | 3.0% | |
| CGU-2-F | 5.0% | |
| CGU-3-F | 4.0% | |
| CGU-5-F | 4.0% | |
| PCH-53 | 2.0% | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed:

1. An active matrix-TN liquid crystal display, comprising a nematic liquid crystal mixture having a birefringence Δn of at least 0.20, said mixture comprising at least one fluorinated terphenyl of formula I

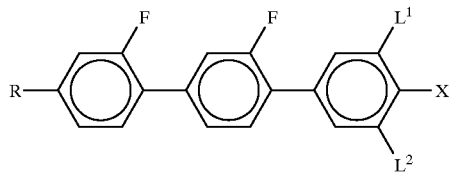

and at least one fluorinated terphenyl of formula II

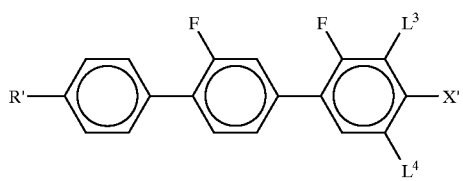

wherein
R and R' are each independently of one another an alkyl of up to 12 C atoms, optionally substituted by halogen, CH$_2$ group optionally replaced, in each case independently of one another, by —O—,

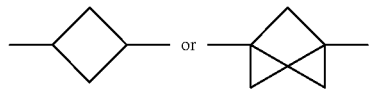

in such a manner that oxygen atoms are not linked directly to one another,
X and X' are each independently F, Cl, CF$_3$, OCF$_3$ or OCHF$_2$, and
L$^1$–L$^4$ are each independent H or F, at least one compound of formula III

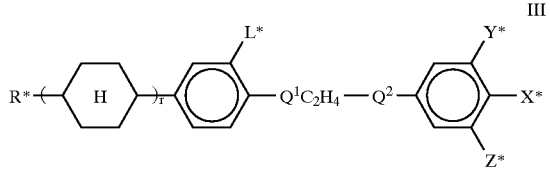

wherein
R* is alkyl or alkenyl of up to 15 C atoms optionally substituted by halogen, at least one CH$_2$ group optionally replaced, in each case independently of one another, by —O—,

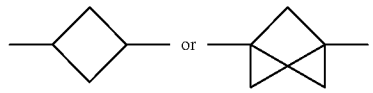

in such a manner that oxygen atoms are not linked directly to one another,
r is 0 or 1,
X* is F, Cl, CF$_3$, OCF$_3$ or OCHF$_2$,
L*, Y* and Z* are each H or F, one of Q$^1$ and Q$^2$ is 1,4-phenylene or 3-fluoro-1,4-phenylene and the other is a single bond, at least one compound of formula IV to VII:

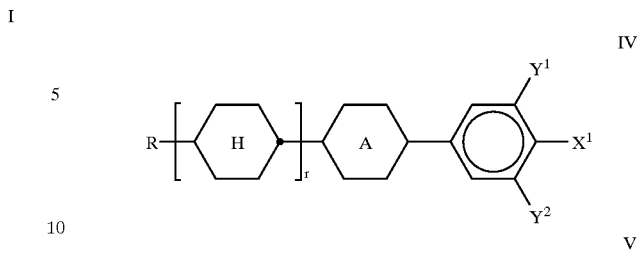

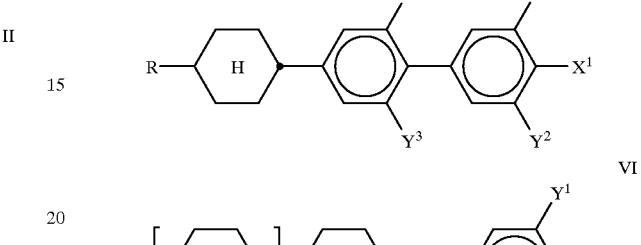

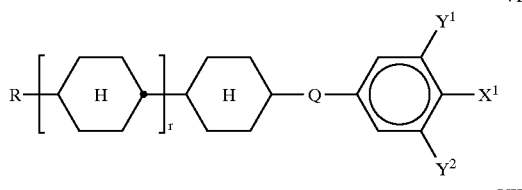

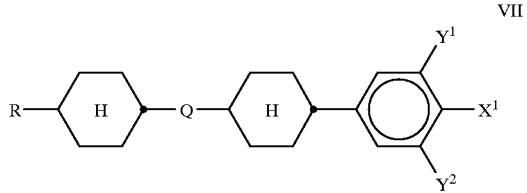

wherein
X$^1$ is F, Cl, CF$_3$, OCF$_3$, OCHF$_2$, fluoroalkyl or fluoroalkoxy of up to 7 carbon atoms,
Y$^1$ and Y$^2$ are each independently H or F,
Q is —C$_2$H$_4$—, —C$_4$H$_9$— or —CO—O—, and
ring A is trans-1,4-cyclohexylene or 1,4phenylene.

2. A nematic liquid crystal mixture having a birefringence Δn of at least 0.20, consisting essentially of at least one fluorinated terphenyl of formula I

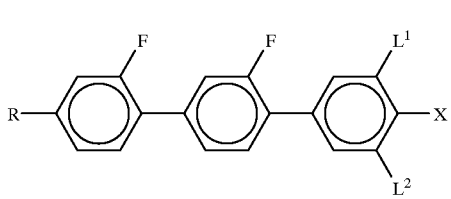

at least one fluorinated terphenyl of formula II

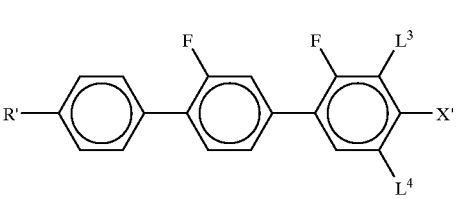

wherein
R and R' are each, independently of one another, alkyl of up to 12 C atoms, optionally substituted by halogen, at least one CH₂ group optionally replaced, in each case independently of one another, by —O—,

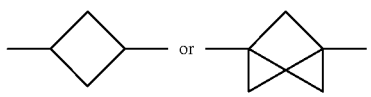

in such a manner that oxygen atoms are not linked directly to one another,

X and X' are each independently Fl, Cl, CF₃, OCF₃ or OCHF₂, and $L^1$–$L^4$ are each independently H or F, and at least one compound of formula III

III

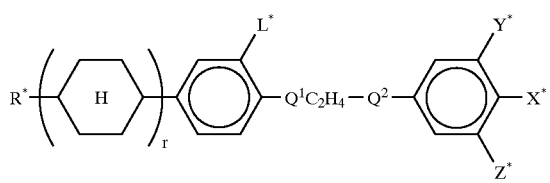

wherein $R^*$ is alkyl or alkenyl of up to 15 C atoms optionally substituted by halogen, at last one CH₂ group optionally replaced, in each case independently of one another, by —O—,

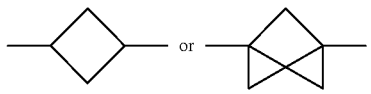

in such a manner that oxygen atoms are not linked directly to one another, r is 0 or 1, $X^*$ is F, Cl, CF₃, OCF₃ or OCHF₂, $L^*$, $Y^*$ and $Z^*$ are each H or F, one of $Q^1$ and $Q^2$ is 1,4-phenylene or 3-fluoro-1,4phenylene and the other is a single bond, wherein the concentration of the compounds of formula I and II is at least 26% by weight of the total mixture.

3. A nematic liquid crystal mixture according to claim 2, that contains not more than 50% by weight of compounds of formula III.

4. A mixture according to claim 2 further consisting essentially of at least one compound of formulae IV to VII:

IV

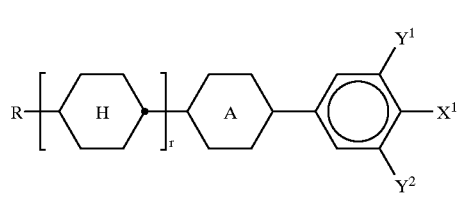

V

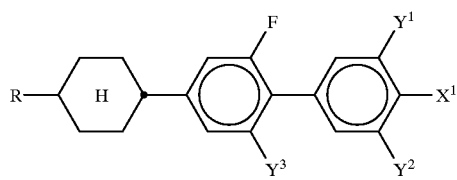

VI

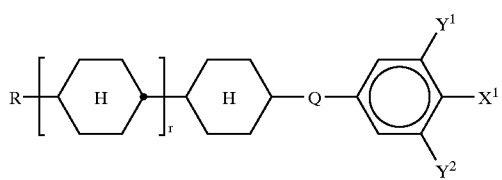

VII

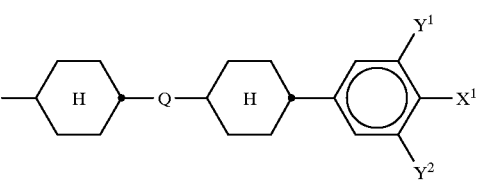

wherein

R is alkyl or alkenyl of up to 12 C atoms, optionally substituted by halogen, at least one CH₂ group optionally replaced, in each case independently of one another, by —O—,

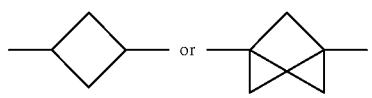

in such a manner that oxygen atoms are not linked directly to one another, $X^1$ is F, Cl, CF₃, OCF₃ or OcHF₂ fluoroalkyl or fluoroalkoxy of up to 7 carbon atoms, $Y^1$ and $Y^2$ are each independently H or F, Q is —C₂H₄—, —C₄H₉— or —CO—O—, A is trans-1,4 cyclohexylene or 1,4phenylene, and r is 0 or 1.

5. A mixture according to claim 4, wherein the compound of formula V is a compound of formula Va, Vb or a combination of both Va and Vb Va

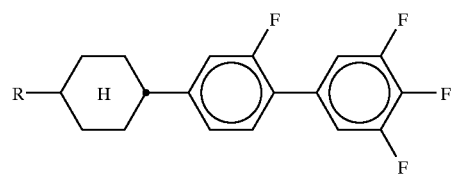

Vb

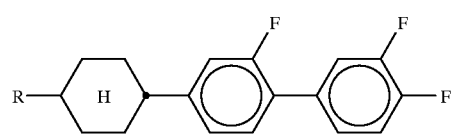

6. A mixture according to claim 2, wherein the liquid crystal mixture further consists essentially of at least one compound of the formula

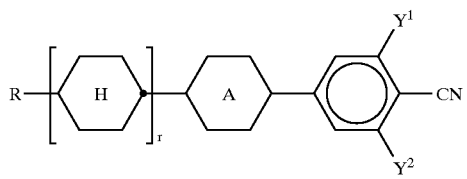

wherein

R is alkyl or alkenyl of up to 12 C atoms optionally substituted by halogen, at least one $CH_2$ group optionally replaced, in each case independently of one another, by —O—,

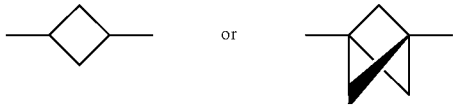

in such a manner that oxygen atoms are not linked directly to one another, r is 0 or 1, ring A is trans-1,4cyclohexylene or 1,4phenylene, and $Y^1$ and $Y^2$ are each independently H or F.

7. An electro-optical liquid-crystal display containing a liquid-crystal mixture, wherein the mixture is one according to claim 2.

8. A display according to claim 7, which is an active matrix twisted nematic liquid crystal display.

9. A mixture according to claim 2, wherein X and $X^1$ are chlorine or fluorine.

10. A nematic liquid crystal mixture having a birefringence Δn of at least 0.20, comprising at least one fluorinated terphenyl of formula I

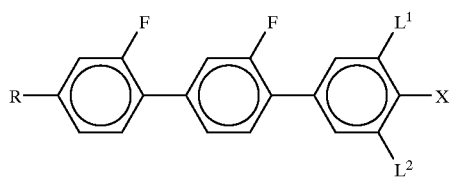

at least one fluorinated terphenyl of formula II

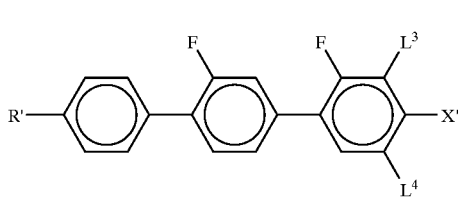

wherein

R and R' are each, independently of one another, alkyl of up to 12 C atoms, optionally substituted by halogen, at least one $CH_2$ group optionally replaced, in each case independently of one another, by —O—,

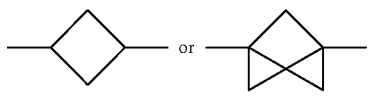

in such a manner that oxygen atoms are not linked directly to one another,

X and X' are each independently F, Cl, $CF_3$, $OCF_3$ or $OCHF_2$, and $L^1$–$L^4$ are each independently H or F, and at least one compound of formula III

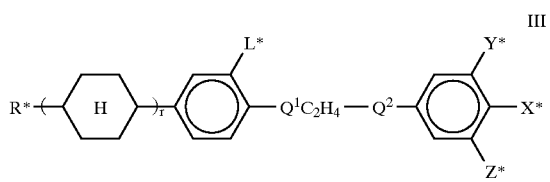

wherein $R^*$ is alkyl or alkenyl of up to 15 C atoms optionally substituted by halogen, at least one $CH_2$ group optionally replaced, in each case independently of one another, by —O—,

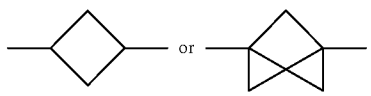

in such a manner that oxygen atoms are not linked directly to one another, r is 0 or 1, $X^*$ is F, Cl, $CF_3$, $OCF_3$ or $OCHF_2$, $L^*$, $Y^*$ and $Z^*$ are each H or F, and one of $Q^1$ and $Q^2$ is 1,4-phenylene or 3-fluoro-1,4-phenylene and the other is a single bond.

* * * * *